United States Patent

[11] 3,614,431

| [72] | Inventors | George M. Low<br>Deputy Administrator of the National Aeronautics and Space Administration with respect to an invention of;<br>Thomas F. McHenry, East Norwalk, Conn. |
|---|---|---|
| [21] | Appl. No. | 77,169 |
| [22] | Filed | Oct. 1, 1970 |
| [45] | Patented | Oct. 19, 1971 |

[54] MINIATURE CARBON DIOXIDE SENSOR AND METHODS
12 Claims, 3 Drawing Figs.

| [52] | U.S. Cl. | 250/43.5 R, 250/83.3 H |
|---|---|---|
| [51] | Int. Cl. | G01n 21/26 |
| [50] | Field of Search | 250/43.5 R, 83.3 H |

[56] References Cited
UNITED STATES PATENTS

| 3,281,596 | 10/1966 | Williston | 250/43.5 R |
| 3,364,351 | 1/1968 | Palmer et al. | 250/43.5 R |
| 3,394,253 | 7/1968 | Harrick et al. | 250/43.5 R |

Primary Examiner—Archie R. Borchelt
Attorneys—W. A. Marcontell, Marvin F. Matthews and John R. Manning ABSTRACT: A fast response, miniature $CO_2$ detector with no moving parts is disclosed for determining the $CO_2$ concentration of any given atmosphere. The embodiment disclosed includes a sensor housing having separate chambers, one of which receives a sample atmosphere and the other which contains a reference atmosphere. The chamber having the reference atmosphere is hermetically sealed and contains separate infrared light source and detector pairs. The sources are alternately actuated by a multivibrator. An optical arrangement includes a 4.27-micron filter for one source and directs energy through first and second optical paths to each detector, where the first path traverses the sample chamber and the second path traverses the reference chamber. If $CO_2$ is present in the sample chamber, the 4.27-micron energy is absorbed to affect the signal output of a corresponding $CO_2$ detector while the 4.27-micron energy to the other reference detector is not affected. When the other source is energized, the optical arrangement directs energy from a 4.0-micron filtered source through third and fourth optical paths to each detector where the third path is equal in length to the first path and the fourth path is equal in length to the second path. The third path also traverses the sample chamber while the fourth path traverses only the reference chamber. The 4.0-micron energy is not affected by $CO_2$ and thus the $CO_2$ detector detects the energy transmitted at a 4.0-mircon wavelength as a reference value and the energy transmitted at a 4.27-micron wavelength is a measure of $CO_2$ concentration. The different values as detected by the $CO_2$ detector are supplied to a comparator circuit which provides an output to a meter calibrated to read partial pressure of the $CO_2$. The reference detector detects the values of light intensity from the two sources and if they are equal, an error comparator has no output. In the event the intensities are not equal, the error comparator provides a signal to a power supply for one of the light sources which adjusts the intensity until parity is obtained.

PATENTED OCT 19 1971

3,614,431

Thomas F. McHenry
INVENTOR

BY W.R. Marcontell

ATTORNEY

MINIATURE CARBON DIOXIDE SENSOR AND METHODS

ORIGIN OF THE INVENTION

The invention described herein was made in the performance of work under a NASA Contract and is subject to the provisions of section 305 of the National Aeronautics and Space Act of 1958, Public Law 85—568 (72 Statute 435; 42 U.S.C. 2457).

1. Field of the Invention

This invention relates to a comparison analyzer device of the optical-electronic type and methods for determining the partial pressure of $CO_2$ in an atmosphere, and more particularly, to a negative-type analyzer system.

2. Description of Prior Art

Prior art devices have analyzed gases by using radiant energy beams which respectively pass through a reference gas chamber and a sample gas chamber and the resultant energy reaching a single detector is compared to determine density. Feedback systems have been proposed for such system but operate from the single detector. This type of system does not measure the light intensity on an equal basis since the light beam traverses the sample as well as the reference atmosphere.

Other gas detection systems use pressure-responsive devices and depend upon pressure changes moving a diaphragm. Still other devices use a single source and two detectors.

None of these devices teach the use of an optical system cooperating with source and detector pairs for both measurement and controlling the parity of the light intensity emitted by two sources.

BRIEF DESCRIPTION OF THE DRAWING

Reference to the drawing will further explain the invention wherein like numerals refer to like parts, and in which.

DESCRIPTION OF THE PREFERRED EMBODIMENT

Figure 1:
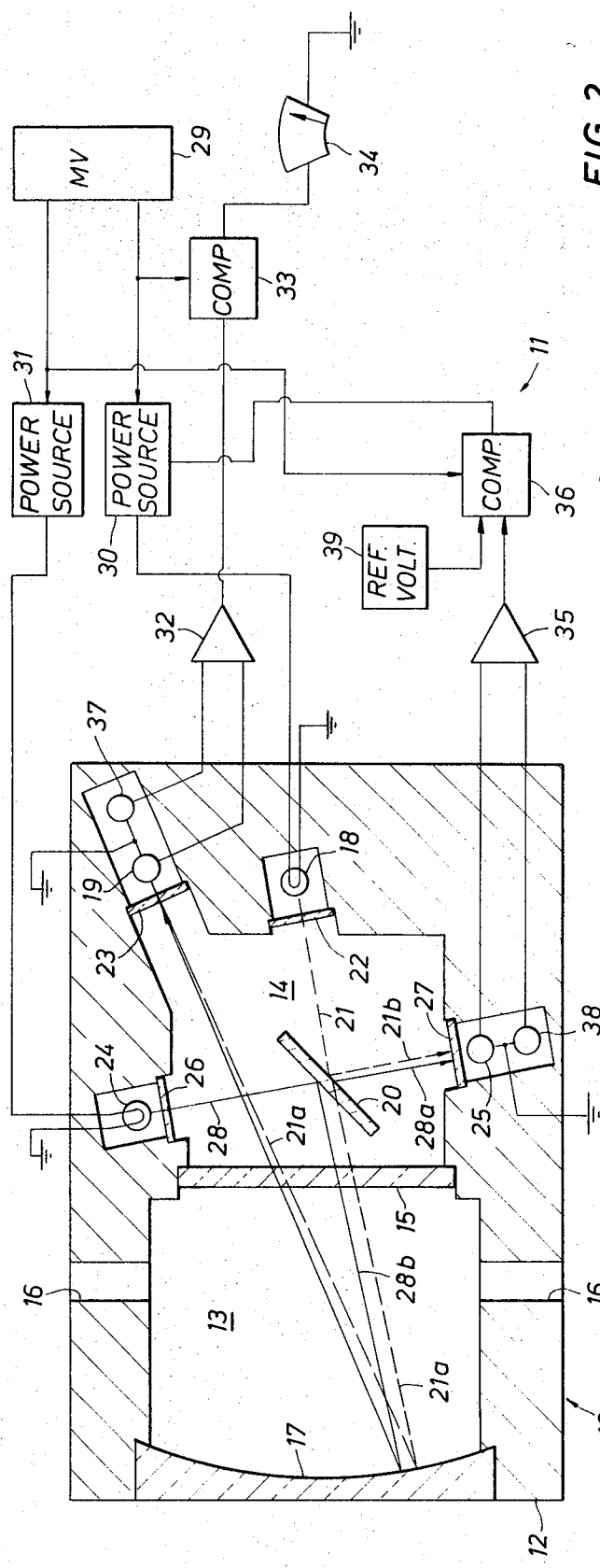
FIG. 1 is a schematic view, generally in central section, showing one embodiment of a sensor and electronic system for detection.

Referring now to FIG. 1, the carbon dioxide gas detector system embodying the present invention is disclosed in schematic form. The system is generally comprised of a sensor 10 and remotely located electronic system 11. The sensor 10 includes a hollow housing 12, which is divided into two chambers 13 and 14 by a sapphire window 15 which has a wide band transmission characteristic for passing radiant energy centered around wavelengths of 4.0 microns and 4.27 microns. Chamber 13 has one or more openings 16 permitting the chamber to receive a gas sample at atmospheric or ambient pressure conditions. Opposite to window 15 is a spherical mirror 17 in the chamber 13 which is arranged to image radiant energy from a radiant energy light source 18 to a detector 19 in a one-to-one ratio. The mirror 17 is preferably overcoated with a protective coating of silicone oxide and has a reflectivity of 95 percent.

Within chamber 14 is a beam splitter 20 which is arranged to split a beam of energy 21 (shown in dashed line) from source 18 into equal intensity parts with one part 21a being transmitted to the mirror 17 and one part 21b being reflected at 90° to the beam of energy. As shown in FIG. 1, a first optical path is defined by the sum of the spacing between the source 18 and the mirror 17 and the spacing between the detector 19 and mirror 17.

Chamber 14 is hermetically sealed and contains a reference atmosphere such as nitrogen. The light source 18 is hermetically sealed from the chamber by a sapphire filter 22 having a transmission band at a wavelength of 4.27 microns. The detector 19 is hermetically sealed with respect to the chamber 14 by a sapphire window 23 having a wide transmission band at least for wavelengths from 4 to 5 microns. Disposed at a right angle to the beam of radiant energy 21 from the light source 18 is a reference light source 24 which is in optical alignment with a reference detector 25. The reference light source 24 is hermetically sealed from the chamber 14 by means of a sapphire filter window 26 having a transmission band at a wavelength of 4.0 microns while the reference detector 25 is hermetically sealed from the chamber 14 by means of a wide transmission band sapphire window 27. A beam of energy 28 (shown in solid line) is divided into equal-intensity parts with one part 28a being transmitted to detector 25 and one part 28b being reflected to mirror 17 and thence to detector 19.

At the point of ray intersection for the radiant energy from the light sources 18 and 24 is the beam splitter 20 which is constructed of germanium and has a transmission band at a wavelength from 4 to 5 microns. The beam splitter 20, as indicated above, splits the beam of energy 21 into equal-intensity parts with one part 21a passing on to the detector 19 and one part 21b being reflected at 90° to the detector 25. A second optical path is defined between the source 18 and detector 25 by the beam part 21b.

A third optical path is defined by the sum of the spacing between the source 24 and splitter 20, the splitter 20 and the mirror 17, and the mirror 17 and detector 19. The third optical path is equal in length to the first optical path. The reason for this is that the sources of alternatively energized, and when source 18 is energized, a beam of energy centered about a transmission band wavelength of 4.27 microns is transmitted to the detector 19. Since the first optical path traverses the sample and reference chambers, the energy is affected by the atmosphere in the chambers. Nitrogen in chamber 14 does not affect the transmission; however, $CO_2$ in the atmosphere in chamber 13 will absorb energy which has a wavelength of 4.27 microns. Therefore, if $CO_2$ is present in chamber 13, absorption of the energy occurs and the signal response of the detector 19 is correspondingly decreased. When the source 24 is energized, a beam of energy 28 centered about a transmission band wavelength of 4.0 microns is transmitted to detector 19 along the third optical path. However, energy has a wavelength of 4.0 microns which is not affected by $CO_2$, and therefore, the energy transmitted along the third optical path is unaffected and the detector 19 therefore responds to provide a reference signal. The difference between the signals developed by energy having 4.0 and 4.27 micron wavelengths is a function of the concentration of $CO_2$ in the atmosphere in chamber 13.

A fourth optical path is defined by the spacing between source 24 and beam splitter 20 and the beam splitter and detector 25. The fourth optical path is equal in length to the second optical path so that detector 25 responds to the intensity of energy from sources 18 and 24.

The light sources 18 and 24 are alternately pulsed by means of a multivibrator 29 which has its outputs coupled to power sources 30 and 31 respectively coupled to the light sources 18 and 24. Thus, as the multivibrator operates, the light sources 18 and 24 are alternately pulsed. The frequency of the multivibrator output is 10 cycles per second.

The output of the detector 19 (which determines the $CO_2$ concentration) is connected via an amplifier 32 to a comparator 33 and, on alternate cycles of the multivibrator, the comparator 33 receives the pulse inputs of the detector 19 which reflect the attenuated energy, if any, from the light source 18 and the reference energy from the light source 24. The detector 19 thus detects the light emitted from the light source 18 filtered to 4.27 microns as well as the light source 24 filtered to 4.0 microns on respective pulsing thereof, and the comparator 33 provides a measurement or indication of the difference of the detected pulses which, in turn, is indicative of the amount of $CO_2$ present in the sample chamber 13. This output can be supplied to a meter 34 which is calibrated into partial pressure.

Because of the nature of the light sources 18 and 24, as will hereinafter be more fully explained, the intensity of the one light source may differ from the intensity of the other light source. This is undesirable in a matched system where parity is required. To maintain parity of the intensity of the light sources, an error control system is provided which includes the detector 25. As noted above, the light from source 24 is supplied to the detector 25 along a fourth optical path which is the spacing between the source and the detector. The light from source 18 is supplied to the detector 25 (on alternate cycles) along a second optical path which is the sum of the spacing between the source 18 and splitter 20 and the spacing between the splitter 20 and the detector 25. The second optical path is equal in length to the fourth optical path. Both the second and fourth optical paths are within the nitrogen atmosphere, and the energy from the 4.27-micron filtered light source 18 and the 4.0-micron filtered light source 24 are unattenuated or not absorbed when detected by the detector 25. Thus, signal outputs from detector 25 are equal if the if the intensities of the light sources 18 and 24 are equal. The respective signals from the detector 25 are supplied via an amplifier 35 to a comparator circuit 36 which produces an output only when there is a difference in the signals. The output of the comparator 36 is supplied to the power source 30 for source 18 and provides a control adjustment for the power source 30 to alter the intensity of the light source 18 until parity of intensities is obtained for the light sources 18 and 24. Thus, a constant-level output is maintained for the light sources. The operation of the comparators is synchronized with the operation of the multivibrator 29 to accommodate the comparison of successive pulse inputs.

As shown in FIG. 1, each detector 19 and 25 is coupled in a bridge circuit with a temperature compensation detector 37 and 38. The detectors 19, 25, 37 and 38 are constructed of crystals of triglycine sulfate (TGS) and the detectors 37 and 38 are shielded from the reference detectors 19 and 25 so as to respond only to temperature. The output of the temperature detectors is also coupled via the amplifiers to the comparators and provides for a temperature correction input. Comparator 36 is also provided with a reference voltage source 39 which stabilizes the comparator with respect to voltage drift.

Figure 2:
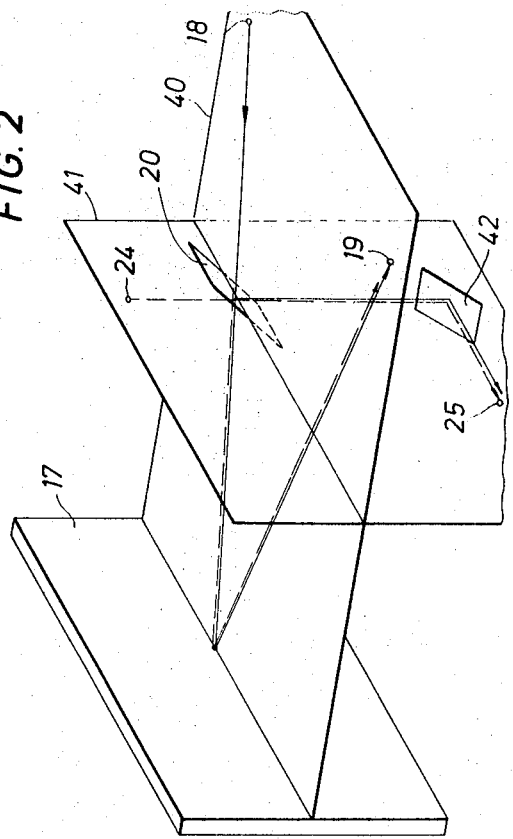
FIG. 2 is a schematic representation of a preferred spacial configuration of the optical system.

Turning now to FIG. 2, a preferred spacial arrangement for the optical system is disclosed. In FIG. 2, a first plane 40 is arranged to generally intersect the central point of the spherical mirror 17. The source 18 and detector 19 lie in the first plane 40. In a perpendicular plane 41, the source 24 is located above the first plane 40 and aligned with a folding mirror 42 which deflects transmission to the detector 25. The beam splitter 20 is shown disposed the intersection axis of the two planes 40 and 41. The folding mirror 42 which has not been described before, consists of a germanium lens with an antireflection coating for 95 percent transmittance in the 4- to 5-micron region. With the foregoing arrangement, the sensor can be designed to occupy about 1.8 cubic inches of volume and have a weight of about 1.3 ounces.

Figure 3:
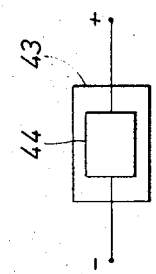
FIG. 3 is a view of a source embodying the present invention.

With respect to the details of the light sources, they are comprised of platinum which is evaporated onto a smooth mica base. As shown in FIG. 3, the base 43 is slightly larger than the platinum deposit 44. The platinum is vacuum deposited in a 2 millimeter-square area and is 1 molecule thick. Platinum was selected after first evaluating positive and negative temperature coefficient flakes. Positive temperature coefficient flakes were not satisfactory because they became nearly an insulator as temperature was increased. This resulted in heater voltages which then approached breakdown potentials. Negative temperature coefficient flakes had some success, but to obtain a time constant requirement of 100 milliseconds, the flakes had to be 1 to 2 microns in thickness. Such large flakes typically exhibit large resistance changes which continue to increase with time at high temperatures. Nichrome films were also evaluated and became unstable at temperatures about 300° C. Aluminum oxide substrates approximately 1,000 A. thick were produced and coated with nichrome; however, these were extremely fragile and shattered at high temperatures. Nichrome films on mica substrates oxidized at high temperatures and exhibited hot spot formations resulting in further oxidation and increased nonuniformity in heating.

After the above investigations, platinum was selected and made in a thin film to reduce its resistance to about 100 ohms per square. In addition, the back side of the mica substrate 43 is coated with an opaque gold reflector to enhance the apparent emissive power. With the disclosed platinum source, if the sources are aged in an oven at 1,000° C. for an extended period of time, say 100 hours, the impedance levels off. With a platinum source as defined, time constants of 50-70 milliseconds are obtained. In construction, gold electrodes are deposited first and the conductor leads soldered in place. The platinum film is then formed to provide a very high melting point and great resistance to chemical attack.

Further modifications and alternative embodiments will be apparent to those skilled in the art in view of this description and accordingly, the foregoing specification is considered to be illustrative only.

What is claimed is;

1. A carbon-dioxide-sensing device including:
    a housing having first and second chambers, said first chamber being open to an atmosphere which can contain carbon dioxide, said second chamber being hermetically sealed and containing a reference atmosphere,
    a spectral transparent window separating said first and second chambers and a reflecting means disposed in said first chamber opposite to said window,
    a first infrared light source and a first detector means in said second chamber on a first plane, said first light source being arranged to transmit infrared radiation along a first axis via said window and reflecting means to said first detector means, said radiation thereby passing through said first and second chambers along a first-defined optical path,
    first optical filter means centered about a wavelength at which carbon dioxide absorbs radiation, said first filter means being disposed in front of said first light source,
    a second infrared light source and a second detector means in said second chamber, said second light source being capable of transmitting radiation along a second axis in a second plane perpendicular to said first plane,
    second optical filter means centered about a wavelength which transmits radiation unaffected by an atmosphere containing carbon dioxide, said second filter means being disposed in front of said second light source,
    beam splitter means in said second chamber and disposed at an intersection of said first and second axes, said radiation from said first light source being reflected to said second detector means thereby defining a second optical path,
    said second light source in said second chamber being aligned with and spaced relative to said beam splitter means so as to transmit radiation to said first detector means along a third path equal in length to said first-defined path, and
    said second detector means in said second chamber being in optical alignment with said beam splitter so as to receive radiation transmitted from said second light source along a fourth path equal in length to said second-defined path.

2. The apparatus of claim 1 and further including means for alternately applying power to said first and second light sources.

3. The apparatus of claim 2 and further including first means coupled to said first detector means for comparing the output of said first detector means to determine the concentration of carbon dioxide.

4. The apparatus of claim 3 and further including second means coupled to said second detector means for comparing the output of said second detector means, and means responsive to said comparing means for adjusting one of said light sources to place the light output intensity of said first and second light sources at parity.

5. The apparatus of claim 4 wherein said means for alternately applying power to said first and second light sources includes multivibrator means.

6. The apparatus of claim 4 wherein said first and second comparing means are synchronously coupled to said multivibrator means.

7. The apparatus of claim 1 wherein said second optical path includes a folding mirror.

8. The apparatus of claim 6 wherein said second chamber contains a nitrogen atmosphere.

9. The apparatus of claim 6 wherein said reflecting means has a spherical surface.

10. The apparatus of claim 1 wherein said first optical filter means have a 4.27-micron wavelength and said second filter means have a 4.0-micron wavelength.

11. A method of determining the presence of carbon dioxide in a sample atmosphere comprising:
during one time period, transmitting first infrared radiation at a wavelength at which carbon dioxide absorbs radiation along a first path traversing a reference atmosphere which will not absorb radiation and a sample atmosphere which can contain carbon dioxide,
splitting said first infrared radiation to transmit said first radiation along a second path traversing said reference atmosphere,
during another time period, transmitting second infrared radiation at a wavelength unaffected by carbon dioxide along a third path traversing said reference atmosphere and said sample atmosphere where said third path is equal in length to said first path,
splitting said second infrared radiation to transmit said second radiation along a fourth path equal in length to said second path and traversing said reference atmosphere,
detecting the amount of radiation transmitted along said first and third paths for determining the concentration of carbon dioxide,
detecting the amount of radiation transmitted along said second and fourth paths for determining the parity of intensity, and regulating the intensity of one of said radiations to maintain the first and second radiations in parity.

12. The method of claim 11 wherein said first radiation is transmitted at wavelength of 4.27 microns and said second radiation is transmitted at a wavelength of 4.0 microns.